United States Patent [19]

Paoli

[11] Patent Number: 5,325,381
[45] Date of Patent: Jun. 28, 1994

[54] MULTIPLE BEAM DIODE LASER OUTPUT SCANNING SYSTEM

[75] Inventor: Thomas L. Paoli, Los Altos, Calif.
[73] Assignee: Xerox Corporation, Stamford, Conn.
[21] Appl. No.: 995,284
[22] Filed: Dec. 22, 1992
[51] Int. Cl.5 .............................................. G02B 5/30
[52] U.S. Cl. .................................... 372/24; 359/204; 359/495; 359/629; 359/885; 359/890
[58] Field of Search ............... 359/196, 204, 212, 216, 359/217, 502, 634, 495, 494, 497, 498, 629, 885, 890; 372/24

[56] References Cited

U.S. PATENT DOCUMENTS

| | | | |
|---|---|---|---|
| 3,690,756 | 9/1972 | Smith | 355/4 |
| 4,424,442 | 1/1984 | Kitamura | 250/236 |
| 4,445,125 | 4/1984 | Scifres et al. | 346/108 |
| 4,474,422 | 10/1984 | Kitamura | 350/6.8 |
| 4,591,903 | 5/1986 | Kawamura et al. | 358/75 |
| 4,613,201 | 9/1986 | Shortle et al. | 372/24 |
| 4,637,679 | 1/1987 | Funato | 350/6.5 |
| 4,761,046 | 8/1988 | Funato | 350/3.71 |
| 4,847,642 | 7/1989 | Murayama et al. | 346/157 |
| 4,873,541 | 10/1989 | Hirose et al. | 346/160.1 |
| 4,903,067 | 2/1990 | Murayama et al. | 346/160 |
| 4,962,312 | 10/1990 | Matuura et al. | 250/236 |
| 5,068,677 | 11/1991 | Matsuura et al. | 346/108 |
| 5,113,279 | 5/1992 | Hanamoto et al. | 359/196 |
| 5,157,533 | 10/1992 | Hanamoto | 359/204 |
| 5,179,462 | 1/1993 | Kageyama et al. | 359/204 |
| 5,243,359 | 9/1993 | Fisli | 346/1.1 |

OTHER PUBLICATIONS

W. T. Tsang entitled "CW Multiwavelength Traverse-Junction-Stripe Lasers Grown by Molecular Beam Epitaxy Operating Predominantly in Single-Longitudinal Modes," pp. 441-443 of vol. 36, No. 6, of Applied Physics Letter, Mar. 15, 1980.

Okuda et al. entitled "Simultaneous CW Operation of 5-Wavelength Integrated GaInAsP/InP DFB Laser Array With 50 Å Lasing Wavelength Separation," pp. L904-L906, vol. 23, No. 12 of the Japanese Journal of Applied Physics, Dec. 1984.

*Primary Examiner*—Frank Gonzalez
*Attorney, Agent, or Firm*—John M. Kelly

[57] ABSTRACT

Multiple beam output scanning is obtained from a single raster scanning system (ROS) having a rotating mirror and a single set of scan optics. A plurality of coaxially overlapping laser beams from a common spatial location have either different polarization states or wavelengths. The swept beams are then separated by a plurality of optical beam splitters and absorption type optical polarizers and optical filters. The separated laser beams may be directed onto associated photoreceptors. The photoreceptors are beneficially located such that the optical path lengths from the laser beam sources to each photoreceptors are substantially the same.

32 Claims, 8 Drawing Sheets

MULTIPLE BEAM DIODE LASER OUTPUT SCANNING SYSTEM

The present invention relates to multiple beam output scanning systems.

BACKGROUND OF THE PRESENT INVENTION

The present application relates to the following co-pending United States Patents and Patent Applications: "Raster Output Scanner for a Multistation Printing System," U.S. Pat. No. 5,243,359, filed Dec. 19, 1991; "Diode Laser Multiple Output Scanning System," Ser. No. 07/948,531 (still pending), filed Sep. 22, 1992; "Multi-Beam, Orthogonally-Polarized Emitting Monolithic Quantum Well Lasers," Ser. No. 07/948,524 (still pending), filed Sep. 22, 1992; "Polarization Switchable Quantum Well Laser," Ser. No. 07/948,522 (still pending), filed Sep. 22, 1992; and "A Raster Output Scanner for a Single Pass Printing System which Separates Plural Laser Beams by Wavelength and Polarization," Ser. No. 07/948,530 (still pending), filed Sep. 22, 1992. These applications are all assigned to the assignee hereof and are all hereby incorporated by reference.

In xerographic printing (also called electrophotographic printing), a latent image is formed on a charged photoreceptor, usually by raster sweeping a modulated laser beam across the photoreceptor. The latent image is then used to create a permanent image by transferring and fusing toner that was electrostatically attracted to the latent image onto a recording medium.

While xerographic printing has been successful, problems arise when attempting to print at very high speed. One set of problems relates to the sweeping of the laser beam across the photoreceptor. As printing speed increases, it becomes more and more difficult to sweep the laser beam as fast as is required. While other sweeping methods are known, the most common method is to deflect the laser beam from a rotating mirror. Thus one way of increasing the sweep speed is to rotate the mirror faster. However, extremely fast mirror rotation requires an expensive drive motor, expensive bearings, and a powerful laser.

Other techniques of increasing the beam sweep speed include 1) sweeping the laser beam with a multifaceted, rotating polygon mirror, and/or 2) sweeping several laser beams simultaneously. Rotating polygon mirrors and their related optics are so common that they are generically referred to as ROSs (Raster Output Scanners). Printers that sweep several beams simultaneously are commonly referred to as multiple beam printers.

The beam sweep speed problem becomes very important when printing in color at high speed. This is because a color xerographic printer overlaps separate images for each color, called a system color, that is printed. While a dual color printer uses only two images, a full color printer typically requires four images: one for each of the three primary colors of cyan, magenta, yellow, and an additional image for black.

Color prints are currently produced by sequentially transferring and fusing overlapped system colors onto a single recording medium that is passed multiple times, once for each system color, through the printer. Such printers are commonly referred to as multiple pass printer. Conceptually it is possible to imprint multiple colors on a recording medium in one pass through the printer by using a sequence of xerographic stations, one for each system color. If each station is associated with a separate photoreceptor, the printer is referred to as a multistation printer; if the stations use different positions on the same photoreceptor, the printer is referred to as a single station/multiposition printer.

Multistation and single station/multiposition printers have greater printed page output than multipass printers operating at the same raster sweep speed. However, the commercial introduction of multistation and single station/multiposition printers has been delayed by 1) cost problems, at least partially related to the cost of multiple xerographic stations, each of which has its own ROS, and 2) image quality problems, at least partially related to the difficulty of producing separate images on each photoreceptor and then registering (overlapping) the separate images to produce a color output.

Proposed prior art multistation printers usually use an individual ROS (each comprised of a separate polygon mirror, lens system, and related optical components) for each station. For example, U.S. Pat. No. 4,847,642 to Murayama et al. involves such a system. Problems with such systems include the high cost of producing nearly identical multiple ROSs and the difficulty of registering the system colors.

A partial solution to the problems of multistation xerographic systems with individual ROSs is disclosed in U.S. Pat. No. 4,591,903 to Kawamura et al. That patent, particularly with regards to FIG. 6, teaches a recording apparatus (printer) having multiple recording stations and multiple lens systems, but only one rotating polygon mirror. Thus, the cost of the system is reduced. However, differences in the lenses and mirror surfaces could still cause problems with the registration of the different latent images.

Another approach to overcoming the problems of multistation printers having individual ROSs is disclosed in U.S. Pat. No. 4,962,312 to Matuura, et al. That patent teaches spatially overlapping a plurality of beams using an optical beam combiner, deflecting the overlapped beams using a single polygon mirror, separating the deflected beams using an optical filter (and polarizers if more than two beams are used), and directing the separated beams onto associated photoreceptors. The advantage of overlapping the laser beams is a significant cost reduction since the ROS is shared. It is believed that a commercial embodiment of the apparatus disclosed in U.S. Pat. No. 4,962,312 would be rather complicated and expensive, especially if four system colors are to be printed. The use of optical beam combiners to overlap beams so that they have similar optical axes and similar sized spots is believed to be difficult, expensive, and time consuming.

One solution to the problems with the teachings of U.S. Pat. No. 4,962,312 is disclosed in co-pending U.S. Pat. No. 5,243,359, filed Dec. 19, 1991. That application provides a raster output scanning system employing a rotating polygon mirror that simultaneously deflects a plurality of clustered, dissimilar wavelength laser beams having common optical axes and substantially common origins from common mirror surface areas. The clustered beams are subsequently separated by a plurality of optical filters and are then directed onto associated photoreceptors of a multistation printer. However, economically feasible optical filters require that the dissimilar beams to be separated by a sufficiently large wavelength, about 50 nm. For example, U.S. Pat. No. 5,243,359 utilizes lasers emitting at 645, 695, 755, and 825 nm. Since laser emission from closely spaced laser sources over this wavelength span is not yet available using one semiconductor material system, practical systems need to integrate different semiconductor material systems, such as AlGaAs and AlGaInP. Additionally, the wide wavelength span necessitates that the photoreceptive surface(s) has adequate response over the span, which includes infrared portions of the optical spectrum. However, few photoreceptive surfaces respond well in the infrared.

A further improvement on the teachings of U.S. Pat. No. 4,962,312 is disclosed in co-pending U.S. patent application Ser. No. 07/948,531, filed Sep. 22, 1992. That application provides a raster output scanning (ROS) apparatus which simultaneously sweeps a plurality of orthogonally polarized and dissimilar wavelength laser beams having common optical axes from common mirror surface areas. The swept laser beams are subsequently separated by a combination of a polarized beam separator and a dichroic beam separator. The separated laser beams are subsequently directed onto associated photoreceptive regions of a single station/multiposition printer, or onto associated photoreceptors of a multistation printer. Similarly dimensioned and registered spots are readily obtained on all photoreceptive regions, beneficially by establishing a substantially similar optical path length for each laser beam. However, the economic feasibility of that system requires inexpensive polarized beam separators and inexpensive dichroic beam separators which adequately separate coaxial combinations of beams by reflecting one beam and transmitting the other.

As described in the preceding co-pending U.S. Patent application, a required propterty of these separators is that their transmission/reflection characteristics do not change substantially as the laser beams are scanned through angles as large as 15° from the nominally incident direction. While such separators are known in the art, their fabrication is complex and adds cost to the apparatus. Furthermore, since the transmission/reflection characteristics of such separators depend on the wavelength of the incident laser beams, as described in the above application, their optical performance in an operating ROS will change as the wavelengths of the coaxial beams change, e.g. due to temperature variations of the laser or as a result of laser degradation.

Accordingly, there is a need for an improved apparatus that simultaneously deflects and separates multiple, orthogonally polarized and dissimilar wavelength laser beams having substantially common optical axes. The apparatus should produce similarly dimensioned spots that readily can be brought into registration.

SUMMARY OF THE INVENTION

The present invention provides for a raster output scanning (ROS) apparatus which simultaneously sweeps a plurality of orthogonally polarized and dissimilar wavelength laser beams having common optical axes from common mirror surface areas. The swept laser beams are subsequently separated by a combination of polarizers and optical filters. The polarizers and optical filters are the absorption type and therefore transmit only the beam with the desired polarization or wavelength. The transmitted laser beams are subsequently directed onto associated photoreceptive regions of a single station/multiposition printer, or onto associated photoreceptors of a multistation printer. Similarly dimensioned and registered spots are readily obtained on all photoreceptive regions, beneficially be establishing a substantially similar optical path length for each laser beam.

The inventive apparatus can be implemented in several ways. For example, in a first embodiment two orthogonally polarized, individually modulated, coaxial laser beams are split into two groups of beams by an optical beam splitter. Each group of beams then passes through an associated absorption type polarization selective optical filter. The two optical filters are controlled such that one optical filter passes the laser beam having one polarization and the other optical filter passes the orthogonally polarized laser beam. The separated laser beams may then be directed onto one or more photosensors.

In another embodiment, a bundle of orthogonally polarized and dissimilar wavelength coaxial laser beams is split into multiple groups of beams by an optical beam splitter. Each group of beams then passes through individual polarizers which transmit similarly polarized laser beams while absorbing the orthogonally polarized beams. Those transmitted beams are then split by an optical beam splitter into one or more sets of identically polarized, but dissimilar wavelength, beams which pass through one or more optical filters. Each optical filter transmits one beam at a specified wavelength while absorbing the others. Thus the bundle of laser beams is separated into individual beams.

An alternative embodiment first splits the bundle of coaxial laser beams into a plurality of bundles by using one or more optical beam splitters. Each bundle of laser beams is then passed through a combination comprised of a polarizer and an optical filter. Each polarizer/filter combination transmits one component beam of the bundle, corresponding to a unique combination of polarization and wavelength, while absorbing the others. In this way, separate and isolated beams are obtained. The described embodiments beneficially include devices, such as mirrors, to set each laser beams's optical path length the same.

It is an aim of this invention to utilize absorptive polarizers and optical filters to separate laser beams from a bundle of orthogonally polarized and distinctly different wavelength laser beams in a scanning apparatus which simultaneously deflects the bundled laser beams. The use of absorptive polarizers and optical filters improves on the prior art teachings by reducing the cost and complexity of the scanning apparatus while improving optical performance.

BRIEF DESCRIPTION OF THE DRAWINGS

In general, like reference numerals denote like elements in each of the figures.

DETAILED DESCRIPTION OF THE ILLUSTRATED EMBODIMENTS

Figure 1:
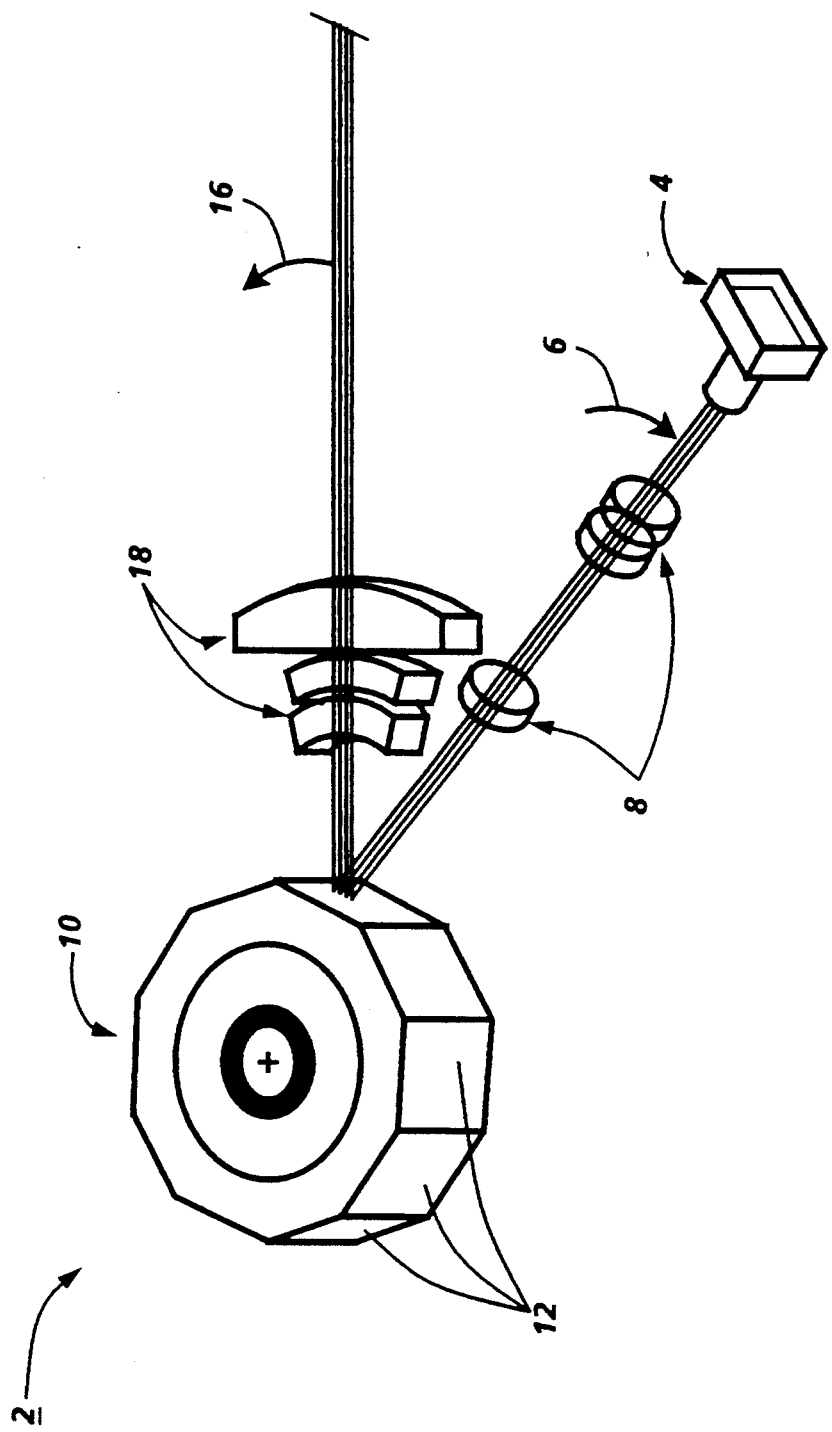
FIG. 1 shows a simplified perspective and schematic view of a raster output scanner (ROS) used in the various illustrated embodiments of the present invention.

A basic raster output scanner 2 used in the illustrated embodiments of the present invention is described with reference to FIG. 1. The raster output scanner 2 includes a laser source 4 that outputs multiple laser beams 6 from a substantially common spatial location. While FIG. 1 show four beams 6, some of the described embodiments use a laser source 4 that outputs only two beams. For clarity, only the chief rays of the beams are shown. Each beam may be independently modulated with data appropriate to expose a photoreceptive element with a desired image.

An input optical system 8 directs the laser beams 6 onto overlapping, coaxial optical paths such that they illuminate common areas of a rotating polygon mirror 10 having a plurality of facets 12. The polygon mirror 10 repeatedly and simultaneously deflects the laser beams in the direction indicated by the arrow 16. The deflected laser beams are input to a set of imaging and correction optics 18 that focuses the laser beams and corrects for errors such as polygon angle error and wobble.

Figure 2:
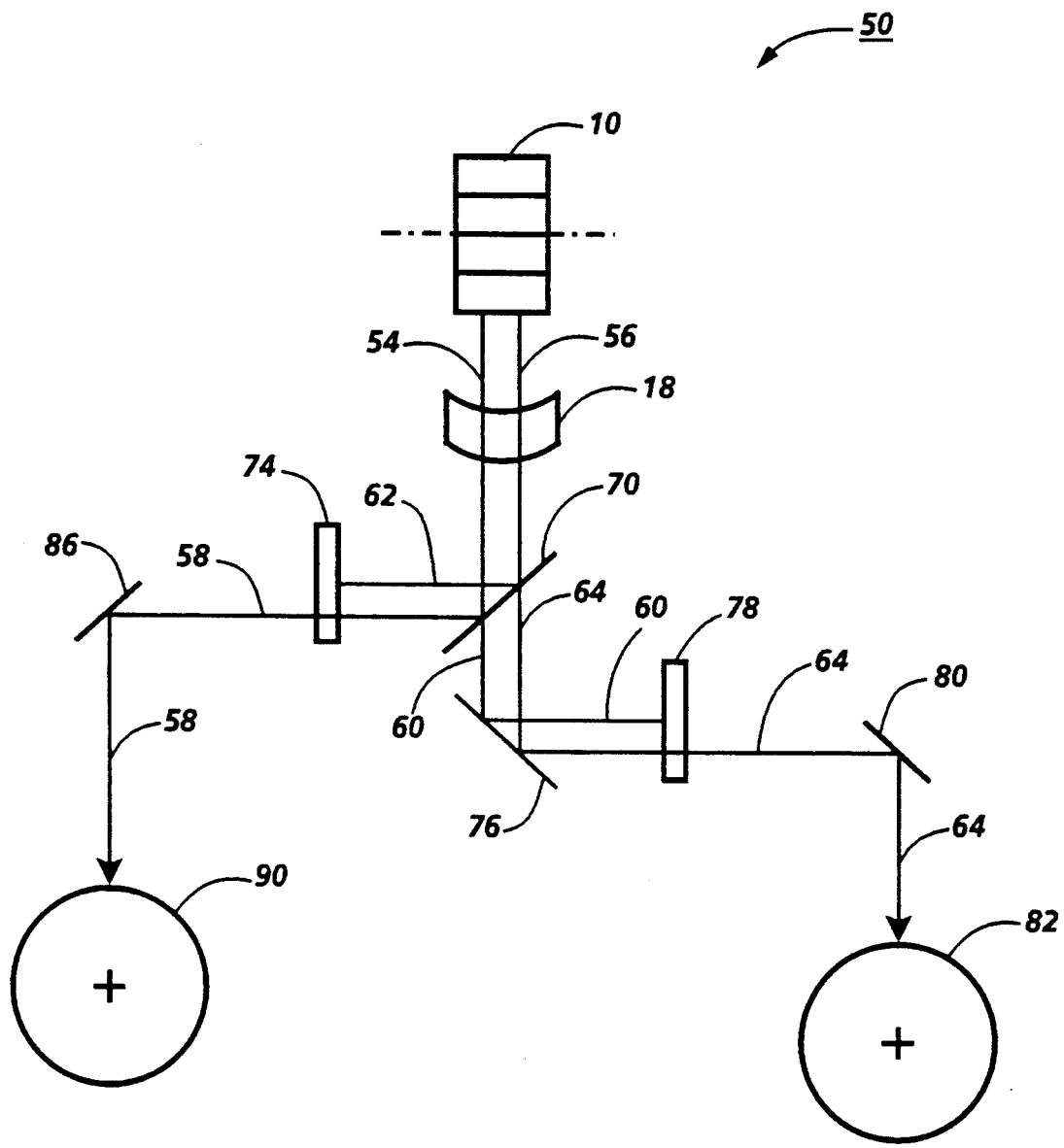
FIG. 2 shows a simplified schematic view of a dual laser beam raster output scanning (ROS) apparatus according to a first embodiment of the present invention.

The raster output scanner 2 (not all components of which are shown in FIG. 2) is used in a first embodiment apparatus 50 illustrated in FIG. 2. In this embodiment, the raster output scanner 2 outputs only two laser beams (instead of four as shown in FIG. 1) that are designated 54 and 56. Again, as in FIG. 1, only the chief rays are shown. In this embodiment the beams have substantially the same optical wavelength, but are linearly polarized in orthogonal directions in the plane perpendicular to their propagation direction. After passing through the correction optics 18 the laser beams 54 and 56 are, respectively, divided into beams 58 and 60 and into beams 62 and 64 by a beam splitter 70. In this embodiment the laser beams 58 and 60 have substantially equal intensities, as do the laser beams 62 and 64.

Figure 3:
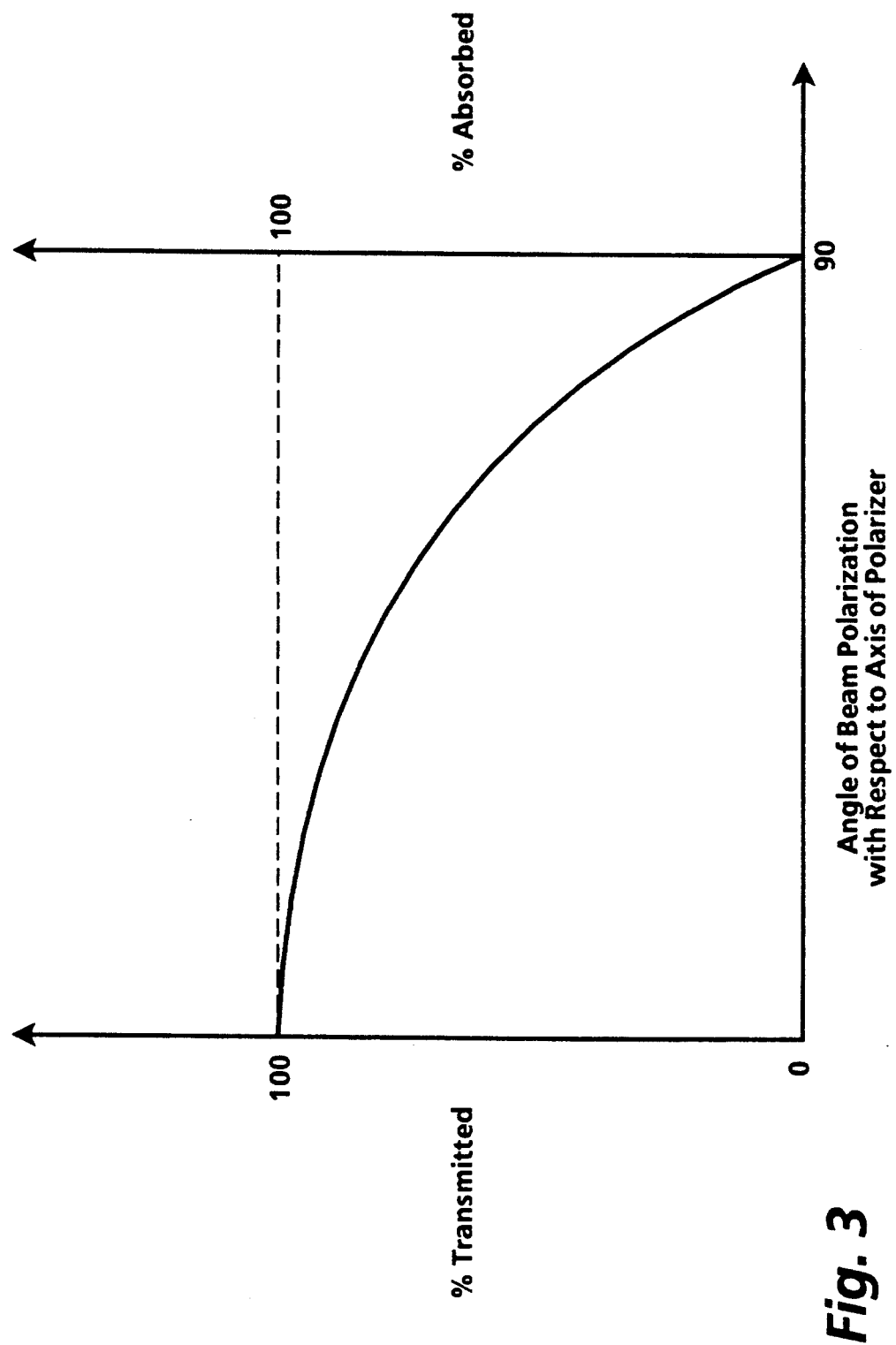
FIG. 3 shows the transmission characteristics of an absorption-type polarizer.

The beam splitter 70 is a partially transparent metallic film or multiple layer dielectric film constructed such that half of the intensity of an incident optical beam is transmitted while the other half is reflected. Such beam splitters are well known to those skilled in the applicable arts and are frequently used optical components. After reflection from the splitter 70, the laser beams 58 and 62 pass to a polarizer 74 that has transmission characteristics as shown in FIG. 3. The optical polarizer 74 is made from a material which absorbs light polarized in a particular direction while transmitting light polarized in the orthogonal direction. The polarizer 74 is aligned such that it absorbs beam 62 and transmits beam 58. Similarly, after transmission by the beam splitter 70, beams 60 and 64 reflect off a mirror 76 and pass through an absorptive polarizer 78. Polarizer 78, which has the same transmission characteristics as the polarizer 74, is aligned such that it absorbs beam 60 and transmits beam 64. A mirror 80 reflects the laser beam 64 onto a photoreceptor 82, while a mirror 86 reflects the laser beam 58 onto a photoreceptor 90.

The apparatus 50 is useful for two color printing since the image created on each photoreceptor corresponds to a different system color. The optical components 70, 76, 80, and 86 are positioned and oriented such that the optical path lengths from the laser source 4 (not shown in FIG. 2) to the photoreceptors 82 and 90 are substantially equal. To reduce problems associated with coaxially aligning the beams, obtaining equal optical path lengths, and registering the laser spots on different photoreceptors, the dual laser beam apparatus of FIG. 2 uses a laser device 4 that generates coaxially overlapping, cross-polarized laser beams. The laser device 4 may be either a monolithic diode laser array, or it may be two non-monolithic diode lasers closely spaced in a single integrated package. Orthogonality of the linearly polarized beams may be established either by the relative orientation of the two laser chips within the package, or by the relative orientation of the linearly polarized beams emitted by a monolithic laser array, as disclosed in co-pending U.S. patent applications, Ser. No. 07/948,524 and Ser. No. 07/948,522. With either type of source, the laser device 4 provides a substantially common spatial origin for both laser beams.

As previously mentioned, the polarizers 74 and 78 have optical transmission/reflection characteristics as shown in FIG. 3. Polarizers of the absorption-type, commonly known as dichroic polarizers, are well known to those in the applicable arts. Reference may be made to E. H. Land, Journ. of the Optical Society of America, vol. 41, beginning on pp. 957 (1951). Polarizers of this type are often made by embedding a dichroic polarizing material in a plastic sheet. Their polarization properties are relatively insensitive to changes in the wavelength and angle of the incident light. Consequently they enable improved optical performances at reduced cost when used in a multiple beam scanning apparatus as disclosed in the present invention.

By simultaneously sweeping two, coaxial laser beams from the same spatial location, the apparatus illustrated in FIG. 2 readily produces similarly dimensioned beams at the beam splitter 70. Thus the problem of maintaining equal optical path lengths for each beam reduces to the much simpler problem of maintaining substantially equal optical path lengths from the splitter 70 to the photoreceptors 82 and 90. Each optical path lengths are set by properly positioning mirrors 76, 80, and 86. Further, registration problems are reduced since the characteristics of the mirror surface area and the related optics which sweep and form both beams are common to both. Furthermore, since both beams are nominally at the same wavelength, the beam forming optics do not have to be designed to simultaneously focus multiple wavelengths at the same distance.

By incorporating means for transferring the images on the photoreceptors 82 and 90 onto paper, a two color xerographic print may be produced. Although details of the structure and operation of such means are beyond the scope of the present disclosure, they are well known to those skilled in the art.

Figure 4:
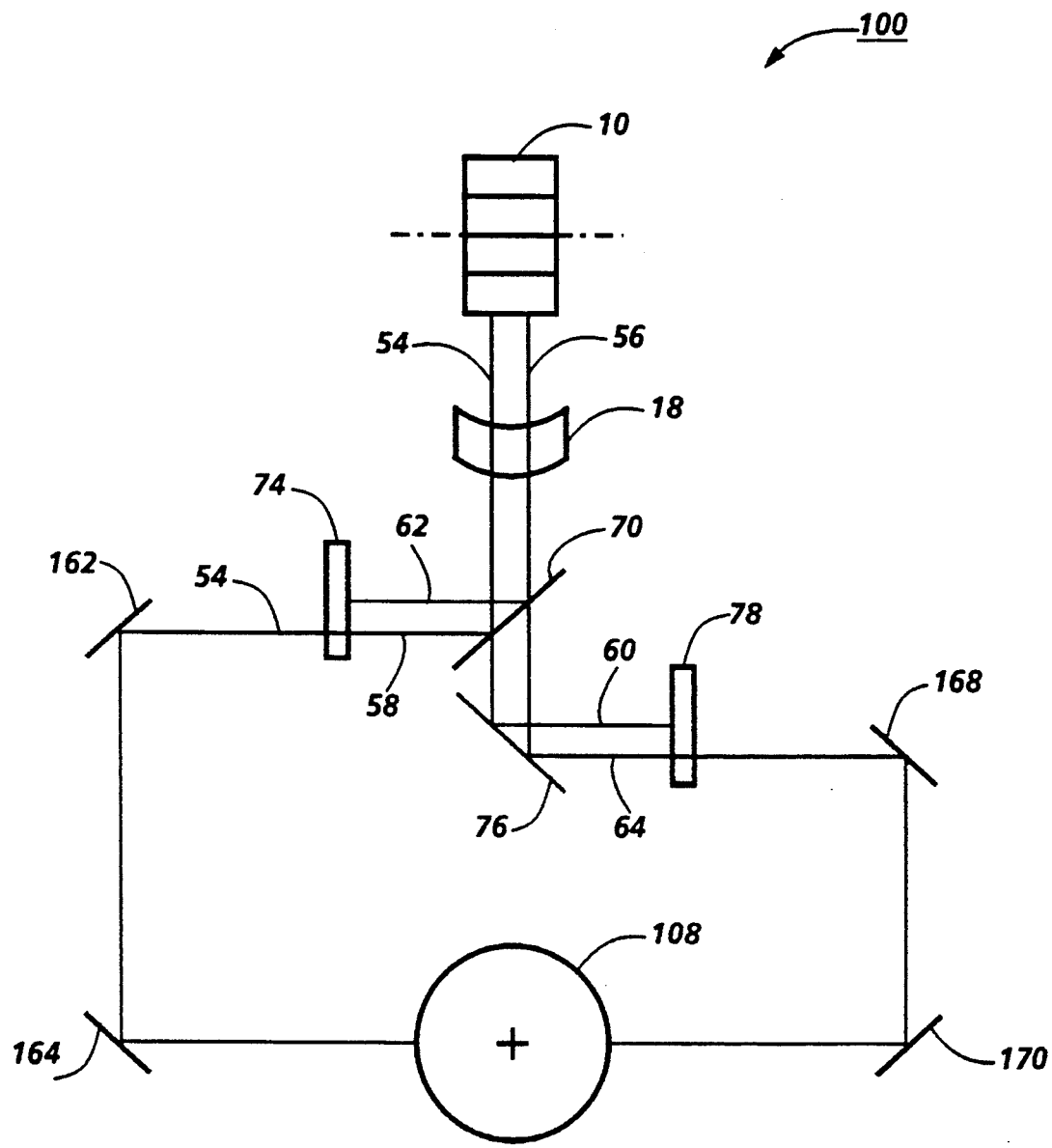
FIG. 4 shows a simplified schematic view of a dual laser beam raster output scanning apparatus according to a second embodiment of the present invention.

FIG. 4 shows of a second embodiment apparatus 100 according to the present invention. Apparatus 100 is a single station/multiposition printer that using the raster output scanner 2 (including polygon 10 and optics 18), simultaneously deflects the two laser beams 54 and 56 across spatially separated regions of one moving photoreceptor 108. As with the apparatus 50, each laser beam has nominally the same optical wavelength but is orothogonally polarized with respect to the other laser beam. After passing through the correction optics 18, the laser beams 54 and 56 are divided into beams 58 and 60, and into beams 62 and 64 by the beam splitter 70. Again, the laser beam 58 and 60, and 62 and 64 have substantially equal intensities. After reflection from the splitter 70, the laser beams 58 and 62 pass to the polarizer 74, again aligned such that it absorbs beam 62 while transmitting beam 58. Similarly, after transmission by the splitter 70, the beams 60 and 64 reflect off the mirror 76 and pass to the polarizer 78, again aligned such that it absorbs beam 60 and transmits beam 64. In the apparatus 100, mirrors 162 and 164 direct the laser beam 58 onto an area of the photoreceptor 108. Mirrors 168 and 170 direct laser beam 64 onto a separate area of the photoreceptor 108.

By incorporating means for transferring the resulting images on the photoreceptor 108 onto paper, a two color xerographic print may be produced.

Figure 5:
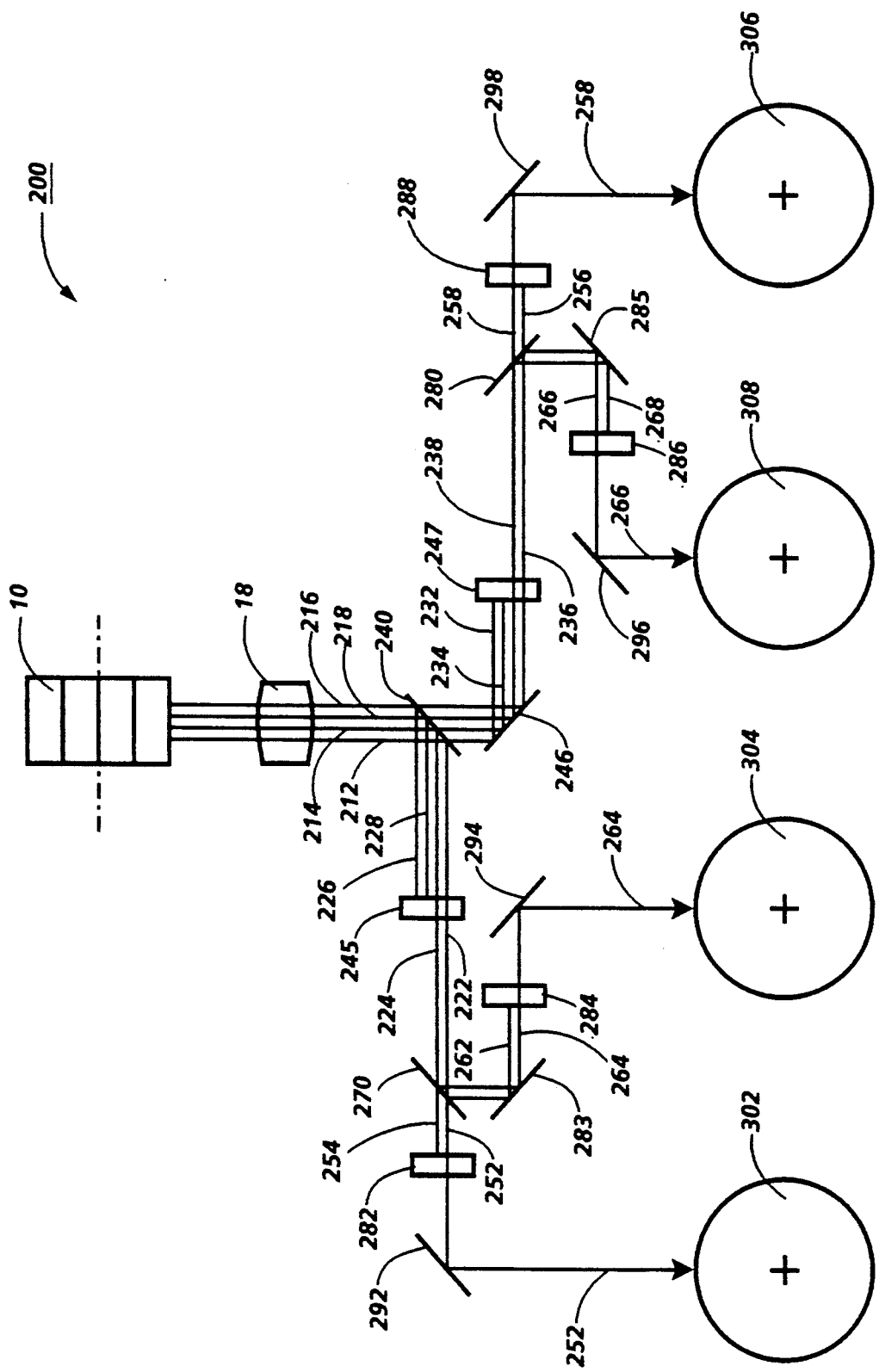
FIG. 5 shows a simplified schematic view of a four laser beam raster output scanner (ROS) apparatus according to a third embodiment of the present invention.

FIG. 5 shows a simplified, schematic view of a third embodiment apparatus 200 in which four laser beams, designated laser beams 212, 214, 216, and 218, are simultaneously scanned across four moving photoreceptors. Once again, only the chief rays are shown. The apparatus 200 is a multiple station printer which uses the raster output scanner 2 of FIG. 1 (including polygon 10, and optics 18, and laser device 4) to produce the four laser beams (not all components of the raster output scanner 2 are shown in FIG. 5). Two of the beams, i.e. laser beams 214 and 216, have the same wavelengths, about 680 nanometers. The other two laser beams, i.e. laser beams 212 and 218, have the same wavelengths, about 625 nm. The laser beams 212 and 214 are polarized in the same direction, which is orthogonal to the polarization of laser beams 216 and 218.

After passing through correction optics 18, the overlapping beams 212, 214, 216, and 218 are split into a first group of beams comprised of beams 222, 224, 226, and 228, and into a second group of beams comprised of beams 232, 234, 236, and 238 via a beam splitter 240. The intensities of the groups are substantially equal. The beam splitter 240 is a partially transparent metallic film or a multiple layer dielectric film, as discussed above with respect to the beam splitter 70. The reflected group of beams, i.e. beams 222, 224, 226, and 228, are input to an absorption-type optical polarizer 245, while the transmitted group, i.e. beams 232, 234, 236, and 238, reflect off a mirror 246 and are then input to an absorption-type optical polarizer 247.

The polarizer 245, which has transmission characteristics as shown in FIG. 3, is aligned such that it absorbs beams 226 and 228 (which are derived from beams 216 and 218, respectively). The polarizer 247, which also has transmission characteristics shown in FIG. 3, is orientated to block beams 232 and 234 (which are derived from beams 212 and 214, respectively). After passing through the polarizer 245, the laser beams 222 and 224 are respectively divided into beams 252 and 262, and into beams 254 and 264 by a beam splitter 270. The intensities of beams 252 and 254 are substantially equal to the intensities of beams 262 and 264, respectively. After passing through the polarizer 247, the laser beams 236 and 238 are respectively divided into 1) beams 256 and 266 and 2) into beams 258 and 268 by a beam splitter 280. The intensities of beams 256 and 258 are substantially equal to the intensities of beams 266 and 268, respectively.

The laser beams 252 and 254 are input to an optical filter 282, while laser beams 262 and 264 first reflect off a mirror 283 and are then input to an optical filter 284. Similarly, laser beams 256 and 258 are input to an optical filter 288 while laser beam 266 and 268 first reflect off a mirror 285 and are then input to an optical filter 286. The optical filters 282 and 288 have the characteristics shown in FIG. 6 (discussed below), while optical filters 284 and 286 have the characteristics shown in FIG. 7 (discussed below). The optical filter 282 absorbs beam 254 and transmits beam 252 while the optical filter 284 absorbs the beam 262 and transmits beam 264. Similarly, the optical filter 286 absorbs beam 268 and transmits beam 266, while the optical filter 288 absorbs beam 256 and transmits laser beam 258.

Mirrors 292, 294, 296 and 298 respectively reflect the now isolated laser beams 252, 264, 266, and 258 onto photoreceptors 302, 304, 306, and 308. Since each laser beam is independently modulated with image information, distinct latent images are exposed onto each photoreceptor. Thus the apparatus 200 may be used for full color reproduction if the image on each photoreceptor corresponds to a different system color.

The apparatus of FIG. 5 uses a laser device 4 (shown in FIG. 1) that generates four coaxially overlapping, cross-polarized laser beams of two dissimilar wavelengths using either a monolithic diode laser array or four non-monolithic diode lasers closely spaced in a single integrated package. The use of two wavelengths (instead of four as in U.S. Pat. No. 5,243,359) considerably simplifies the construction of the laser device and reduces the requirements placed on the photoreceptive elements. Orthogonality of the linearly polarized beams is established either by the relative orientation of the laser chips within a single integrated package, or by the relative orientation of the linearly polarized beams emitted by a monolithic laser array, as disclosed in the previously mentioned U.S. patent application Ser. No. 07/948,524 and Ser. No. 07/948,522. With either type of source, laser device 4 effectively provides a substantially common spatial origin for both laser beams.

Figure 6:
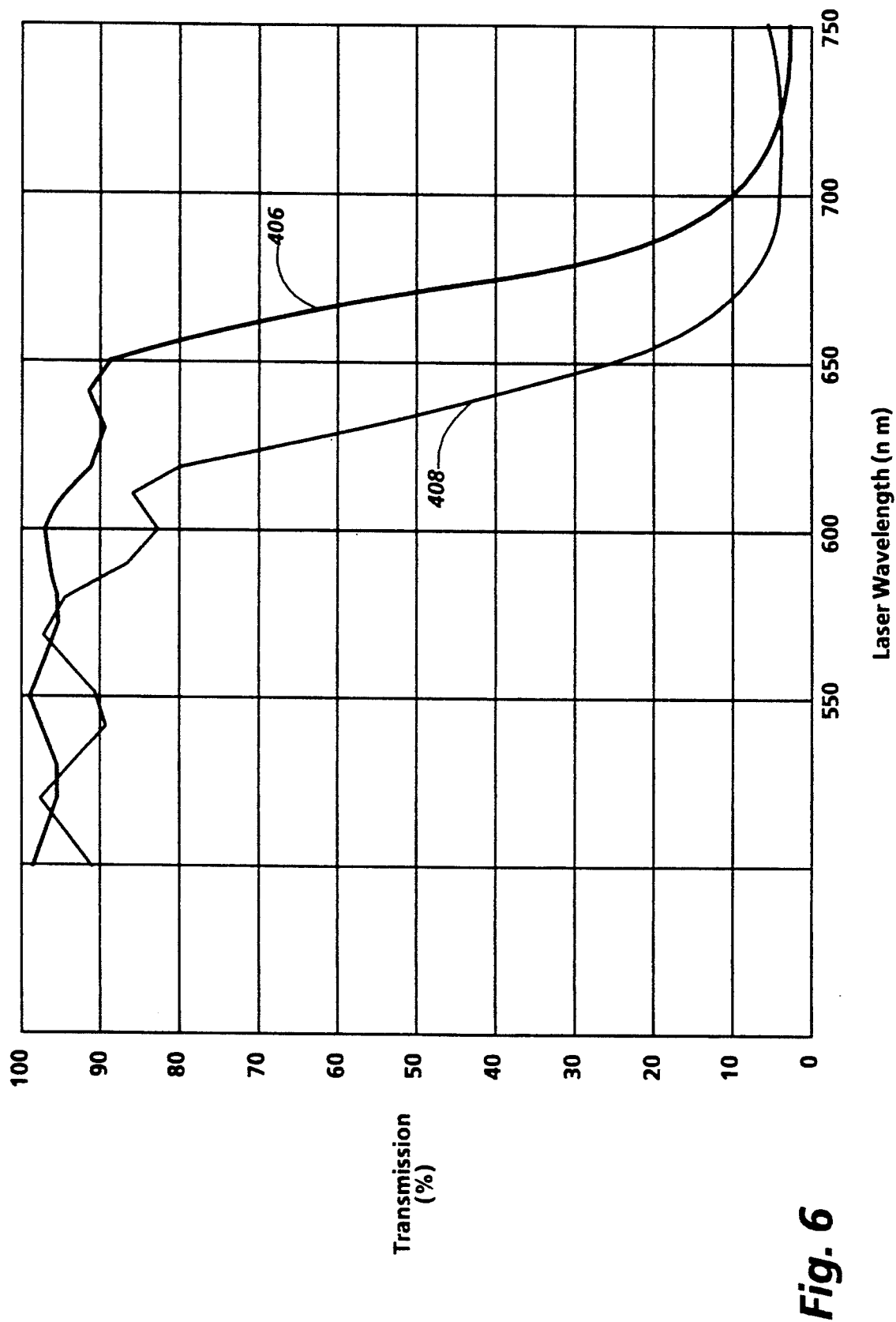
FIG. 6 shows the transmission characteristics of a first bandpass absorption type optical filter.
Figure 7:
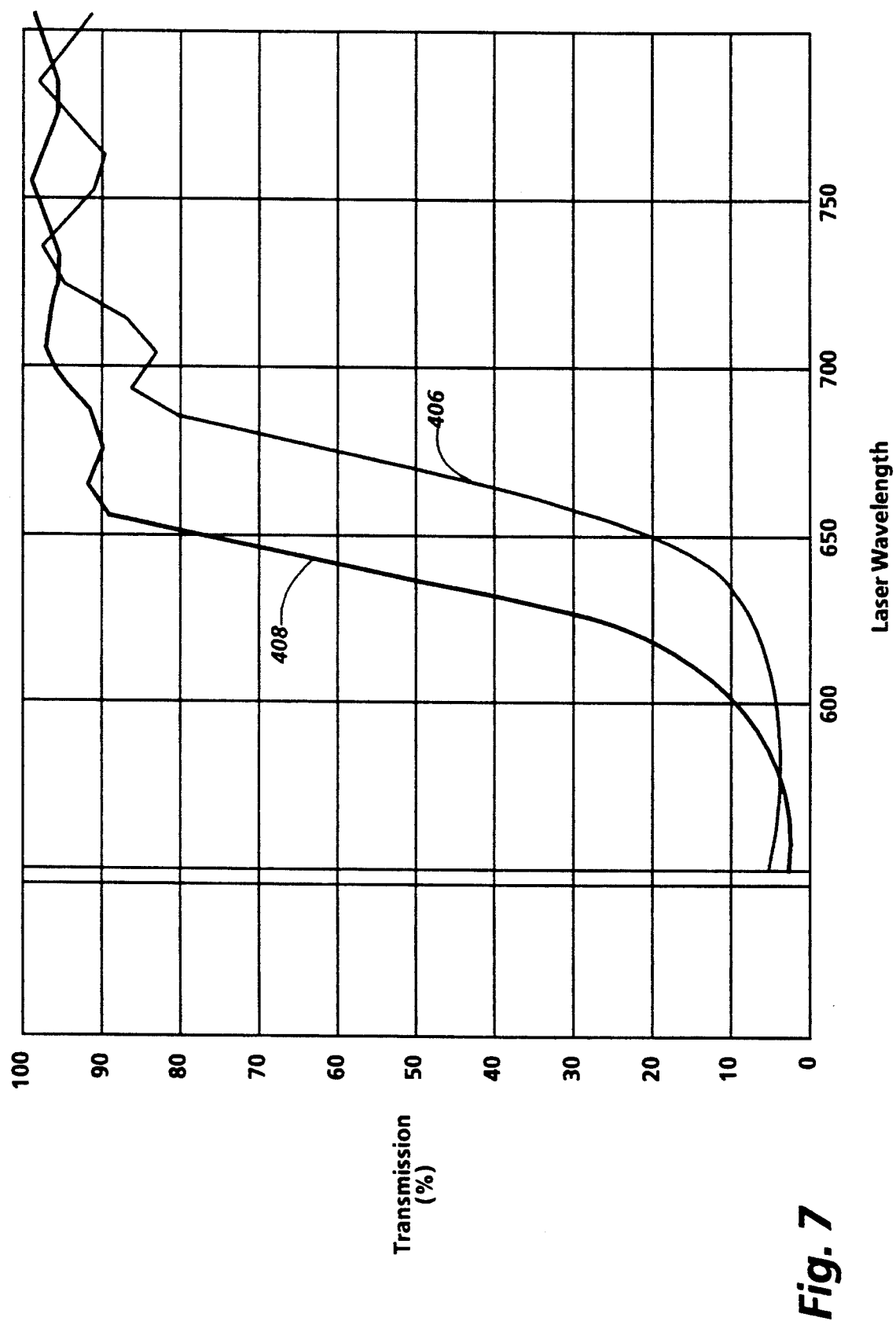
FIG. 7 shows the transmission characteristics of a second bandpass absorption type optical filter.

As previously mentioned, the optical filters 282, 284, 286, and 288 have characteristics as shown in either FIG. 6 and or FIG. 7. The optical characteristic of each filter is chosen to block the laser beams of one wavelength while transmitting laser beams of a different wavelength. For example, the filter of FIG. 6 substantially absorbs a beam at 680 nanometers while transmitting a beam at 625 nanometers. The filter of FIG. 7 absorbs a beam at 625 nanometers while transmitting a beam at 680 nanometers. In FIGS. 6 and 7, the curve 406 represents the characteristics of the optical filter when light strikes at a 45° angle of incidence, while curve 408 represents the filter's characteristics when light strikes at a 60° angle of incidence. Thus for two wavelengths appropriately matched to the optical characteristics of the filters, e.g. 625 nanometers and 680 nanometers, changes in the transmission characteristics of the filter as the laser beams are scanned through angles as large as 15° have little effect on the apparatus performance. Such optical filters are well known in the art. Reference may be had to Volume 1 of "Applied Optics and Optical Engineering," (1965) edited by R. Kingslake, in several places, including chapter 5, number IV and chapter 8, numbers VIII and IX.

Since the system illustrated in FIG. 5 simultaneously forms, sweeps, and corrects each beam, and since all beams are from substantially the same spatial location and have substantially parallel optical axes, similarly dimensioned beams are input to the beam splitter 240.

Thus the problem of maintaining equal optical path lengths for each beam reduces to the much simpler problem of maintaining substantially equal optical path lengths from the beam splitter 240 to the individual photoreceptors. Substantially equal optical path lengths are set by adjusting the individual optical path lengths by properly positioning mirrors 246, 270, 280, 283, 285, 292, 294, 296, and 298. Additionally, the problem of registration is reduced since the characteristics of the mirror surface area and related optics which sweep and form the beams are simultaneously shared by all of the beams.

Many alternative embodiments can be formed by relocating the polarizers and optical filters. For example, the locations of the polarizers and optical filters in FIG. 5 can be interchanged. In such an embodiment, the coaxially bundled beams are first split to produce two groups of beams. Each group is then applied to a polarizer. The beams from the polarizers are then resplit and applied to wavelength selective optical filters. The resulting four beams may then be input to one or more photoreceptors. Other embodiments are also possible and are meant to be included in the scope of this invention.

Figure 8:
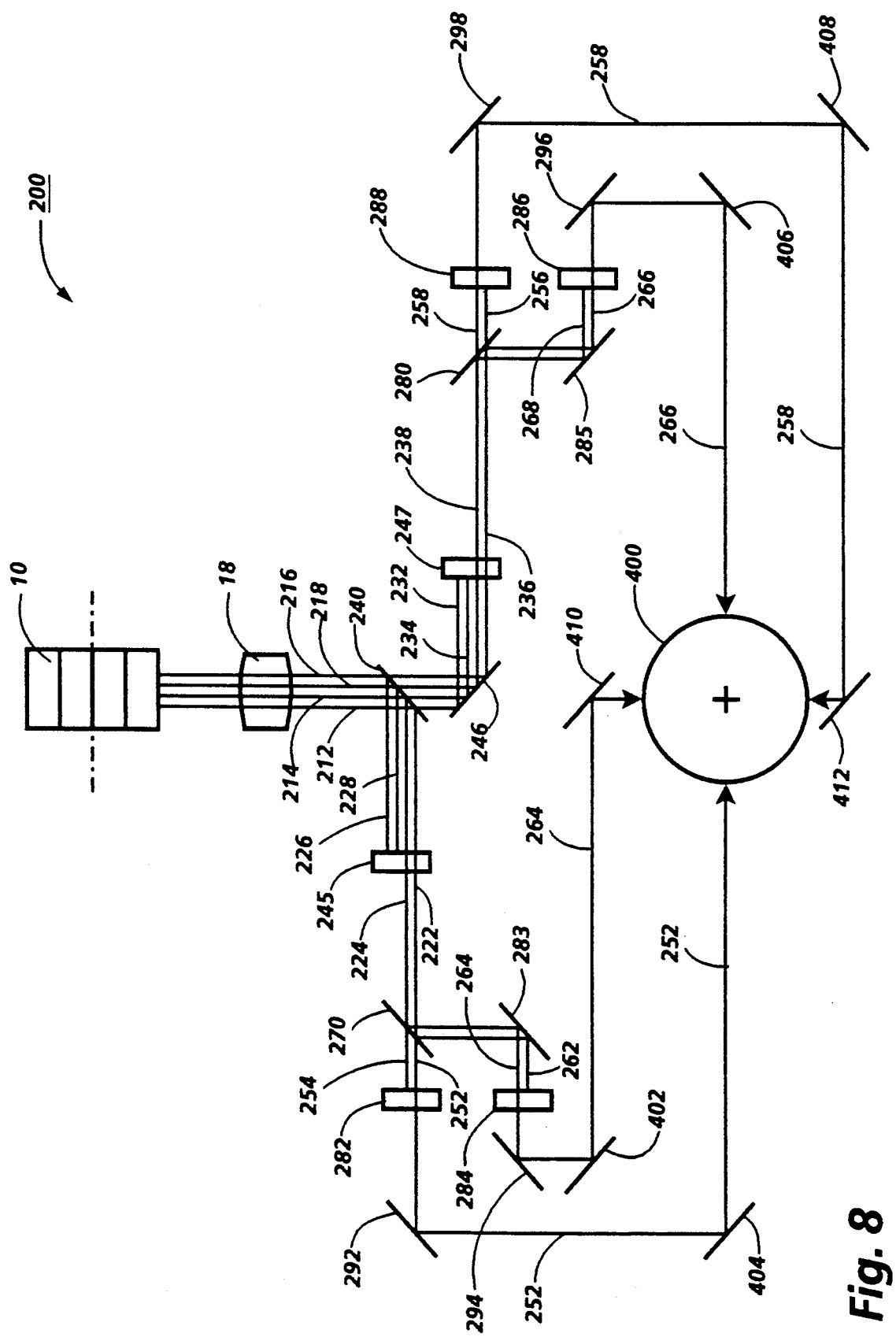
FIG. 8 shows a simplified schematic view of a four laser beam raster output scanner (ROS) apparatus similar that that of FIG. 5, but wherein the laser beams are directed onto a single photoreceptor.

For example, FIG. 8 shows an alternative to the system of FIG. 5 wherein the laser beams 252, 258, 264, and 266 are directed onto a single photoreceptor 400 by reflecting mirrors 402, 404, 406, 408, 410, and 412. The positions of the reflecting mirrors are beneficially adjusted such that the optical path lengths of the laser beams from the source are substantially the same.

The described embodiments logically extend to architectures which use plural laser beams in place of the described individual laser beams. Such architectures, while somewhat more complex, increase the achievable output by simultaneously writing multiple lines. For example, in the case of a four station system as shown in FIG. 5, each single laser beam (such as beam 214) can be replaced by plural laser beams (beneficially from a laser diode array) having similar wavelengths and polarizations. Of course, the multiple beams which replace each single beam must differ from the other multiple beams in either wavelength or polarization. Two laser diode arrays of N lasers each can be fabricated using staggered lasers grown on a grooved substrate as described in U.S. Pat. No. 4,786,918 to Thornton, et al., which is hereby incorporated by reference. Four arrays of N lasers each can be obtained by combining two of those staggered arrays. Alternately, four laser diode arrays of N lasers each can be obtained by use of the integrated package described in co-pending U.S. patent application Ser. No. 07/948,530.

The above described method and apparatus are particularly advantageous when combined with other sections of a xerographic printer. Such other sections may include means for modulating the laser beams, a photoreceptive belt or drum, means for moving the photoreceptor, means for charging the photoreceptor, means for forming a latent image on the photoreceptor, means for transferring the latent image to paper, means for erasing the latent image from the photoreceptor, means for cleaning the photoreceptor, paper transport means, and means for fusing the image onto the paper.

To those skilled in the arts to which this invention relates, many variations and modifications to the present invention will suggest themselves. Accordingly, it is intended that the present invention embrace all alternatives, modifications and variations that fall within the spirit and scope of the appended claims.

What is claimed is:

1. A raster output scanning apparatus, comprising:
   means for producing a bundle of coaxially overlapping and orthogonally polarized first and second laser beams;
   means for sweeping said bundle;
   an optical beam splitter for receiving said swept bundle, said optical beam splitter for splitting said bundle into first and second groups of beams that are derived from said first and second laser beams, said beam splitter further for disposing said first and second groups of beams onto first and second optical paths; and
   a first beam separator on said first optical path, said first beam separator for absorbing said first group's beam that is derived from said second laser beam and for directing said first group's beam that is derived from said first laser beam onto a third optical path.

2. The apparatus according to claim 1, wherein said first and second laser beam are from a substantially common spatial location.

3. The apparatus according to claim 2, further including a second beam separator on said second optical path, said second beam separator for absorbing said second group's beam that is derived from said first laser beam and for directing said second group's beam that is derived from said second laser beam onto a fourth optical path.

4. The apparatus according to claim 3, further including:
   first and second photoreceptors; and
   means for directing said laser beam on said third optical path onto said first photoreceptor and for directing said laser beam on said fourth optical path onto said second photoreceptor.

5. The apparatus according to claim 4, wherein said directing means includes a means for equalizing the optical path lengths from said beam splitter to said first and second photoreceptors.

6. The apparatus according to claim 5, wherein said equalizing means includes a mirror.

7. The apparatus according to claim 3, further including:
   a photoreceptor; and
   means for directing said laser beams on said third and fourth optical paths onto said photoreceptor.

8. The apparatus according to claim 7, wherein said directing means includes a means for equalizing the optical path lengths from said beam splitter to said photoreceptor.

9. The apparatus according to claim 8, wherein said equalizing means includes a mirror.

10. A raster output scanning apparatus, comprising:
    means for producing a bundle of coaxially overlapping first, second, third, and fourth laser beams that originate from a substantially common spatial location, wherein said first and second laser beams have different wavelengths but similar first polarizations, wherein said third and fourth laser beam have differing wavelengths but similar second polarizations which are substantially orthogonal to said first polarizations, wherein said first and third laser beams have substantially the same wavelengths, and wherein said second and fourth laser beams have substantially the same wavelength;

means for sweeping said bundle;

a first beam splitter for receiving said swept bundle and for splitting said bundle into first and second groups of beams that are derived from said first, and second, third, and fourth laser beams;

a first beam separator receiving said first group of beams, said first beam separator for absorbing said first group's beams that are derived from said third and fourth laser beams and for directing said first group's beams that are derived from said first and second laser beams onto a first optical path;

a second beam splitter receiving said laser beams on said first optical path, said second beam splitter for splitting its received laser beams into third and fourth groups of beams that are derived from said first and second laser beams; and a first optical filter for receiving said third group of beams, said first optical filter for absorbing said third group's beams that are derived from said second laser beam and for directing said third group's beams that are derived from said first laser beam onto a second optical path.

11. The apparatus according to claim 10, further including a second optical filter for receiving said fourth group of beams, said second optical filter for absorbing said fourth group's beams that are derived from said first laser beam and for directing said fourth group's beams that are derived from said second laser beam onto a third optical path.

12. The apparatus according to claim 11, further including:

a second beam separator receiving said second group of beams, said second beam separator for absorbing said second group's beams that are derived from said and second laser beams and for directing said second group's beams that are derived from said third and fourth laser beams into a fourth optical path;

a third beam splitter receiving said beams on said fourth optical path, said third beam splitter for splitting its received laser beams into fifth and sixth groups of beams that are derived from said third and fourth laser beams;

a third optical filter for receiving said fifth group of beams, said third optical filter for absorbing said fifth group's beams that are derived from said fourth laser beam and for directing said fifth group's beams that are derived from said third laser beam onto a fifth optical path; and a fourth optical filter for receiving said sixth group of beams, said fourth optical filter for absorbing said sixth group's beams that are derived from said third laser beam and for directing said sixth group's beams that are derived from said fourth laser beam onto a sixth optical path.

13. The apparatus according to claim 12, further including:

a photoreceptor; and means for directing said laser beams on said second, third, fifth and sixth optical paths onto said photoreceptor.

14. The apparatus according to claim 13, wherein said directing means includes means for equalizing the optical path lengths of at least two of said laser beams on said second, third, fifth and sixth optical paths from said first beam separator to said photoreceptor.

15. The apparatus according to claim 14, wherein said equalizing means includes a mirror.

16. The apparatus according to claim 12, further including:

first, second, third, and fourth photoreceptors; and means for directing said laser beams on said second, third, fifth and sixth optical paths onto said first, second, third, and fourth photoreceptors, respectively.

17. The apparatus according to claim 16, wherein said directing means includes means for equalizing the optical path lengths of at least two of said beams on said second, third, fifth and sixth optical paths from said first beam splitter to their respective photoreceptors.

18. A raster output scanning apparatus, comprising:

means for producing a bundle of coaxially overlapping first, second, third, and fourth laser beams that originate from a substantially common spatial location, wherein said first and second laser beams have different wavelengths but similar first polarizations, wherein said third and fourth laser beams have differing wavelengths but similar second polarizations which are substantially orthogonal to said first polarizations, wherein said first and third laser beams have substantially the same wavelength, and wherein said second and fourth laser beams have substantially the same wavelength;

means for sweeping said bundle;

a first beam splitter for receiving said swept bundle and for splitting said bundle into first and second groups of beams that are derived from said first, second, third, and fourth laser beams a first optical filter receiving said first group of beams, said first beam filter for absorbing said first group's beams that are derived from said second and fourth laser beams and for directing said first group's beams that are derived from said first and third laser beams onto a first optical path;

a second beam splitter receiving said beams on said first optical path, said second beam splitter for splitting its received beams into third and fourth groups of beams that are derived from said first and third laser beams; and a first beam separator for receiving said third group of beams, said first beam separator for absorbing said third group's beam that is derived from said third laser beam and for directing said third group's beam that is derived from said first beam onto a second optical path.

19. The apparatus according to claim 18, further including a second beam separator for receiving said fourth group of beams, said second beam separator for absorbing said forth group's beam that are derived from said first laser beam and for directing said fourth group's beam that is derived from said third beam onto a third optical path.

20. The apparatus according to claim 19, further including:

a second optical filter receiving said second group of beams, said second optical filter for absorbing said second group's beams that are derived from said first and third laser beams and for directing said second group's beams that are derived from said second and fourth laser beams onto a fourth optical path;

a third beam splitter receiving said beams on said fourth optical path, said third beam splitter for splitting its received beams into fifth and sixth groups of beams that are derived from said second and fourth laser beam;

a third beam separator for receiving said fifth group of beams, said third beam separator for absorbing said fifth group's beam that is derived from said fourth laser beam and for directing said fifth group's beam that is derived from said second beam onto a fifth optical path, and a fourth beam separator for receiving said sixth group of beams, said fourth beam separator for absorbing said sixth group's beam that is derived from said second laser beam and for directing said sixth group's beam that are derived from said fourth beam onto a sixth optical path.

21. The apparatus according to claim 20, further including:
a photoreceptor; and
means for directing said laser beams on said second, third, fifth and sixth optical paths onto said photoreceptor.

22. The apparatus according to claim 21, wherein said directing means includes means for equalizing the optical path lengths of at least two of said laser beams on said second, third, fifth and sixth optical paths from said first beam separator to said photoreceptor.

23. The apparatus according to claim 22, wherein said equalizing means includes a mirror.

24. The apparatus according to claim 20, further including:
first, second, third, and fourth photoreceptors; and
means for directing said laser beams on said second, third, fifth and sixth optical paths onto said first, second, third, and fourth photoreceptors, respectively.

25. The apparatus according to claim 24, wherein said directing means includes means for equalizing the optical path lengths of at least two of said laser beams on said second, third, fifth and sixth optical paths from said first beam splitter to their respective photoreceptors.

26. A method of separating the individual laser beams from a swept bundle of coaxially overlapping and orthogonally polarized first and second laser beams, the method comprising the steps of;
splitting the swept bundle into first and second groups of beams that are derived from the first and second laser beams;
separating the first laser beam from the first group of beams by absorbing the second laser beam and by directing the first laser beam onto a first optical path; and
separating the second laser beam from the second group of beams by absorbing the first laser beam and by directing the second laser beam onto a second optical path.

27. A method of separating individual laser beams from a swept bundle of coaxially overlapping and orthogonally polarized first, second, third, and fourth laser beams, wherein said first and second laser beams have different wavelengths but similar first polarizations, wherein said third and fourth laser beams have differing wavelengths but similar second polarizations which are substantially orthogonal to said first polarizations, wherein said first and third laser beams have substantially the same wavelength, and wherein said second and fourth laser beams have substantially the same wavelength, the method comprising the steps of;
splitting the swept bundle into first and second groups of beams that are derived from the first, second, third, and fourth laser beams;
separating the first and second laser beams from the first group of beams by absorbing the third and fourth laser beam and by directing the resulting laser beams onto a first optical path;
splitting the laser beams on said first optical path into third and fourth groups of beams that are derived from the first and second laser beams;
filtering the first laser beam from the third group of beams by absorbing the second laser beam and by directing the first laser beam onto a second optical path;
filtering the second laser beam from the fourth group of beams by absorbing the first laser beam and by directing the second laser beam onto a third optical path;
separating the third and fourth laser beams from the second group of beams by absorbing the first and second laser beam and by directing the resulting laser beams onto a fourth optical path;
splitting the laser beams on said fourth optical path into fifth and sixth groups of beams that are derived from the third and fourth laser beams;
filtering the third laser beam from the fifth group of beams by absorbing the fourth laser beam and by directing the third laser beam onto a fifth optical path; and
filtering the fourth laser beam from the sixth group of beams by absorbing the third laser beam and by directing the fourth laser beam onto a sixth optical path.

28. A method of separating individual laser beams from a swept bundle of coaxially overlapping and orthogonally polarized first, second, third, and fourth laser beams, wherein said first and second laser beams have different wavelengths but similar first polarizations, wherein said third and fourth laser beams have differing wavelengths but similar second polarizations which are substantially orthogonal to said first polarizations, wherein said first and third laser beams have substantially the same wavelength, and wherein said second and fourth laser beams have substantially the same wavelength, the method comprising the steps of;
splitting the swept bundle into first and second groups of beams that are derived from the first, second, third, and fourth laser beams;
filtering the first and third laser beams from the first group of beams by absorbing the second and fourth laser beams and by directing the resulting laser beams onto a first optical path;
splitting the laser beams on said first optical path into third and fourth groups of beams that are derived from the first and third laser beams;
separating the first laser beam from the third group of beams by absorbing the third laser beam and by directing the first laser beam onto a second optical path;
separating the third laser beam from the fourth group of beams by absorbing the first laser beam and by directing the third laser beam onto a third optical path;
filtering the second and fourth laser beams from the second group of beams by absorbing the first and third laser beams and by directing the resulting laser beams onto a fourth optical path;
splitting the laser beams on said fourth optical path into fifth and sixth groups of beams that are derived from the second and fourth laser beams;

separating the second laser beam from the fifth group of beams by absorbing the fourth laser beam and by directing the second laser beam onto a fifth optical path; and separating the fourth laser beam from the sixth group of beams by absorbing the second laser beam and by directing the fourth laser beam onto a sixth optical path.

29. A printer having a laser modulating means, a photoreceptor, means for moving the photoreceptor, means for charging the photoreceptor, means for transferring the latent image to paper, means for erasing the latent image from the photoreceptor, means for cleaning the photoreceptor, a paper transport means, and means for fusing the image onto the paper, the printer further having an improved means for forming a latent image on the photoreceptor, comprising:

means for producing a bundle of coaxially overlapping and orthogonally polarized first and second laser beams which are modulated by said laser modulating means;

means for sweeping said bundle of laser beams;

an optical beam splitter for receiving said swept bundle of laser beams, said optical beam splitter for splitting said bundle into first and second groups of beams that are derived from said first and second laser beams, said beam splitter further for disposing said first and second groups of beams onto first and second optical paths;

a first beam separator on said first optical path, said first beam separator for absorbing said first group's beam that is derived from said second laser beam and for directing said first group's beam that is derived from said first laser beam onto a third optical path;

a second beam separator on said second optical path, said second beam separator for absorbing said second group's beam that is derived from said first laser beam and for directing said second group's beam that is derived from said second laser beam onto a fourth optical path; and means for directing said laser beam on said third optical path and said laser beam on said fourth optical path onto said photoreceptor.

30. The printer according to claim 29, wherein said directing means includes a means for equalizing the optical path length along said first and third optical paths with that along said second and fourth optical paths.

31. A printer having a laser modulating means, two photoreceptors, means for moving the photoreceptor, means for charging the photoreceptor, means for transferring the latent image to paper, means for erasing the latent image from the photoreceptor, means for cleaning the photoreceptor, a paper transport means, and means for fusing the image onto the paper, the printer further having an improved means for forming a latent image on the photoreceptor, comprising:

means for producing a bundle of coaxially overlapping and orthogonally polarized first and second laser beams which are modulated by said laser modulating means;

means for sweeping said bundle of laser beams;

an optical beam splitter for receiving said swept bundle of laser beams, said optical beam splitter for splitting said bundle into first and second groups of beams that are derived from said first and second laser beams, said beam splitter further for disposing said first and second groups of beams onto first and second optical paths;

a first beam separator on said first optical path, said first beam separator for absorbing said first group's beam that is derived from said second laser beam and for directing said first group's beam that is derived from said first laser beam onto a third optical path;

a second beam separator on said optical path, said second beam separator for absorbing said second group's beam that is derived from said first laser beam and for directing said second group's beam that is derived from said second laser beam onto a fourth optical path; and means for directing said laser beam on said third optical path onto a first photoreceptor and said laser beam on said fourth optical path onto the second photoreceptor.

32. The printer according to claim 31, wherein said directing means includes a means for equalizing the optical path length along said first and third optical paths with that along said second and fourth optical paths.

* * * * *